United States Patent
Chen et al.

(10) Patent No.: US 8,837,369 B2
(45) Date of Patent: Sep. 16, 2014

(54) SYSTEM AND METHOD FOR INDICATING LOCAL IP ACCESS SUPPORT VIA NAS SIGNALING

(75) Inventors: Yih-Shen Chen, Hsinchu (TW); Chao-Chin Chou, Taipei (TW); Chia-Chun Hsu, Taipei (TW)

(73) Assignee: Mediatek Inc. (TW)

( * ) Notice: Subject to any disclaimer, the term of this patent is extended or adjusted under 35 U.S.C. 154(b) by 146 days.

(21) Appl. No.: 13/540,995

(22) Filed: Jul. 3, 2012

(65) Prior Publication Data

US 2013/0010753 A1 Jan. 10, 2013

Related U.S. Application Data

(60) Provisional application No. 61/504,557, filed on Jul. 5, 2011.

(51) Int. Cl.
*H04Q 7/00* (2006.01)
*H04Q 7/24* (2006.01)
*H04W 48/08* (2009.01)
*H04W 36/00* (2009.01)
*H04W 76/02* (2009.01)
*H04W 48/02* (2009.01)

(52) U.S. Cl.
CPC ............ *H04W 48/08* (2013.01); *H04W 76/028* (2013.01); *H04W 48/02* (2013.01); *H04W 36/0066* (2013.01)
USPC .......................................... 370/328; 370/338

(58) Field of Classification Search
USPC .................. 370/328, 331, 338, 401
See application file for complete search history.

(56) References Cited

U.S. PATENT DOCUMENTS

| | | | |
|---|---|---|---|
| 2007/0047486 A1* | 3/2007 | Lee et al. | 370/329 |
| 2010/0195579 A1* | 8/2010 | Park et al. | 370/329 |
| 2010/0210268 A1 | 8/2010 | Lim et al. | 455/436 |
| 2010/0272013 A1* | 10/2010 | Horn et al. | 370/328 |
| 2010/0278108 A1* | 11/2010 | Cho et al. | 370/328 |
| 2010/0329211 A1* | 12/2010 | Ou | 370/331 |
| 2011/0045826 A1* | 2/2011 | Kim et al. | 455/426.1 |

(Continued)

FOREIGN PATENT DOCUMENTS

| | | |
|---|---|---|
| CN | 101990321 A | 3/2011 |
| CN | 102056347 A | 5/2011 |

(Continued)

OTHER PUBLICATIONS

International Search Report and Written Opinion of International Search Authority for PCT/CN2012/078240 dated Oct. 18, 2012(10 pages).

(Continued)

*Primary Examiner* — Hong Cho
(74) *Attorney, Agent, or Firm* — Zheng Jin

(57) ABSTRACT

A method of providing Local IP Access (LIPA) indication is proposed. In one novel aspect, an enhanced cell selection method is proposed using LIPA capability information. Based on LIPA capability related information, a UE is able to prioritize LIPA-capable cells and establish a corresponding packet data network (PDN) connection accordingly. In one embodiment, LIPA information is informed to the UE via Non Access Stratum (NAS) signaling. The UE stores LIPA capability information when receiving a NAS message from a mobility management entity (MME). Later on, when the UE performs cell selection or reselection in idle mode, the UE can use the stored LIPA capability information to prioritize LIPA-capable cells.

12 Claims, 6 Drawing Sheets

(56) References Cited

U.S. PATENT DOCUMENTS

| | | | |
|---|---|---|---|
| 2011/0171915 A1* | 7/2011 | Gomes et al. | 455/73 |
| 2011/0171953 A1* | 7/2011 | Faccin et al. | 455/426.1 |
| 2011/0268086 A1* | 11/2011 | Liang et al. | 370/331 |
| 2012/0076121 A1* | 3/2012 | Choi et al. | 370/338 |
| 2012/0082090 A1* | 4/2012 | Horn et al. | 370/328 |
| 2012/0182912 A1* | 7/2012 | Watfa et al. | 370/311 |
| 2013/0028237 A1 | 1/2013 | Cheng et al. | 370/331 |
| 2013/0089076 A1* | 4/2013 | Olvera-Hernandez et al. | 370/332 |
| 2013/0308527 A1* | 11/2013 | Chin et al. | 370/328 |

FOREIGN PATENT DOCUMENTS

| | | | |
|---|---|---|---|
| JP | 20133526087 A | | 4/2010 |
| WO | WO2013004187 A1 | | 7/2011 |
| WO | WO2013006471 A1 | | 7/2011 |

OTHER PUBLICATIONS

International Search Report and Written Opinion of International Search Authority for PCT/CN2012/078232 dated Oct. 18, 2012 (13 pages).

USPTO, Office Action of related U.S. Appl. No. 13/540,958 dated Apr. 24, 2013 (27 pages).

Taiwan IPO, Office Action for TW patent application 101123976 dated May 26, 2014 (7 pages).

3GPP TS 36.331 v10.2.0; 3rd Generation Partnership Project; Technical Specification Group Radio Access Network; Evolved Universal Terrestrial Radio Access (E-UTRA); Radio Resource Control (RRC); Protocol Specification (Release 10) (Jun. 2011) p. 38-39, 5.3.3.2; p. 41, 5.3.3.5; p. 56, 5.3.8.1 (5 pages)

JPO, Office Action for JP patent application 2014-506752 dated Jul. 23, 2014 (9 pages).

\* cited by examiner

SYSTEM AND METHOD FOR INDICATING LOCAL IP ACCESS SUPPORT VIA NAS SIGNALING

CROSS REFERENCE TO RELATED APPLICATIONS

This application claims priority under 35 U.S.C. §119 from U.S. Provisional Application No. 61/504,557, entitled "Indication of LIPA Support," filed on Jul. 5, 2011, the subject matter of which is incorporated herein by reference.

TECHNICAL FIELD

The present invention relates generally to mobile communication systems and, more particularly, to providing local IP access in 3GPP LTE/LTE-A systems.

BACKGROUND

The $3^{rd}$ Generation Partnership Project (3GPP) is investigating Evolved Packet System (EPS) as a next generation mobile communication system, and studying Home eNodeB (HeNB) as a small base station installed for local cell coverage. Home base stations are base stations designed to serve relatively small geographic areas and are widely deployed at various locations such as homes, offices, shops, and apartments, etc. These home base stations are often used to improve indoor radio coverage, increase throughput, reduce load on macro-cellular networks, and/or provide other benefits for network operators and/or users. Unlike macro base stations that are carefully deployed at specific locations and maintained by network operators, home base stations may be flexibly deployed in an unplanned manner at any location by users.

In 3GPP, local IP access (LIPA) support is defined as a functional requirement for a home base station. LIPA provides IP capable UEs connectivity to a local IP network, such as an IP network inside a home to which the home base station is connected. For example, LIPA enables a UE to connect to another terminal (e.g., a local printer) that is part of the home network without passing through the mobile operator's core network. Conventionally, if a UE wants to connect to a local printer that has no cellular interface, then the UE needs to use a local communication interface such as a wireless LAN. The use of LIPA enables a UE to use a cellular communication interface to communicate with other terminals within the home network because the home base station functions as a gateway between different wireless access technologies.

Once a Packet Data Network (PDN) connection is established for LIPA transmission, data traffic is directed to the home network, and the home base station forwards the data traffic without passing through the mobile operator's core network. However, signaling traffic will continue to traverse the mobile operator's core network. 3GPP has defined certain requirements for LIPA. First, a user may be notified when a home base station provides access to a residential or enterprise IP network. Second, the mobile operator shall be able to configure the home base station to enable or disable local IP access. Third, the mobile operator shall be able to enable or disable local IP access per user subscription per Closed Subscriber Group (CSG). Each home base station is associated with a CSG cell having a CSG identifier. Whether or not a user is permitted to access a CSG cell is determined based on the user's subscription information.

In 3GPP TR 23.829 and TR 23.859, indications to UEs on whether a PDN connection for LIPA traffic can be initiated and/or on the Access Point Name (APN) to request were discussed. Possible solutions are via UE configuration, NAS signaling, or RRC signaling. However, the details of the options are still unclear. In this patent application, detail designs for various possible methods of providing LIPA indication are proposed.

SUMMARY

A method of providing Local IP Access (LIPA) indication is proposed. In one novel aspect, an enhanced cell selection method is proposed using LIPA capability information. Based on LIPA capability related information, a UE is able to prioritize LIPA-capable cells and establish a corresponding packet data network (PDN) connection accordingly.

In a first embodiment, LIPA information is statically configured in the UE. In one example, a list of CSG IDs and PCI range information per CSG ID having LIPA support is delivered to a UE via an Over the Air (OTA) protocol, such as via Open Mobile Alliance (OMA) Device Management (DM) protocol.

In a second embodiment, LIPA information is informed to the UE via broadcasting or unicasting Radio Resource Control (RRC) signaling. For broadcasting method, the UE obtains CSG ID and LIPA capability information of a cell by reading system information (e.g., SIB1) broadcasted by eNB. For unicasting method, in a first option, eNB indicates the support of LIPA in an RRC connection setup message. In a second option, UE indicates the preference of LIPA in an RRC connection request message. If eNB does not support LIPA, it may redirect the UE to a LIPA-capable cell by handover or connection release/rejection with LIPA redirect information.

In a third embodiment, LIPA information is informed to the UE via Non Access Stratum (NAS) signaling. The general idea of the NAS-based signaling method for LIPA indication is that "the support of LIPA" information is provided to UE by a mobility management entity (MME) via a NAS message after an RRC connection is established for the UE. The UE then stores the LIPA capability information when receiving the NAS message from MME. Later on, when the UE performs cell selection or reselection in idle mode, the UE can use the stored LIPA capability information to prioritize the LIPA-capable cells.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
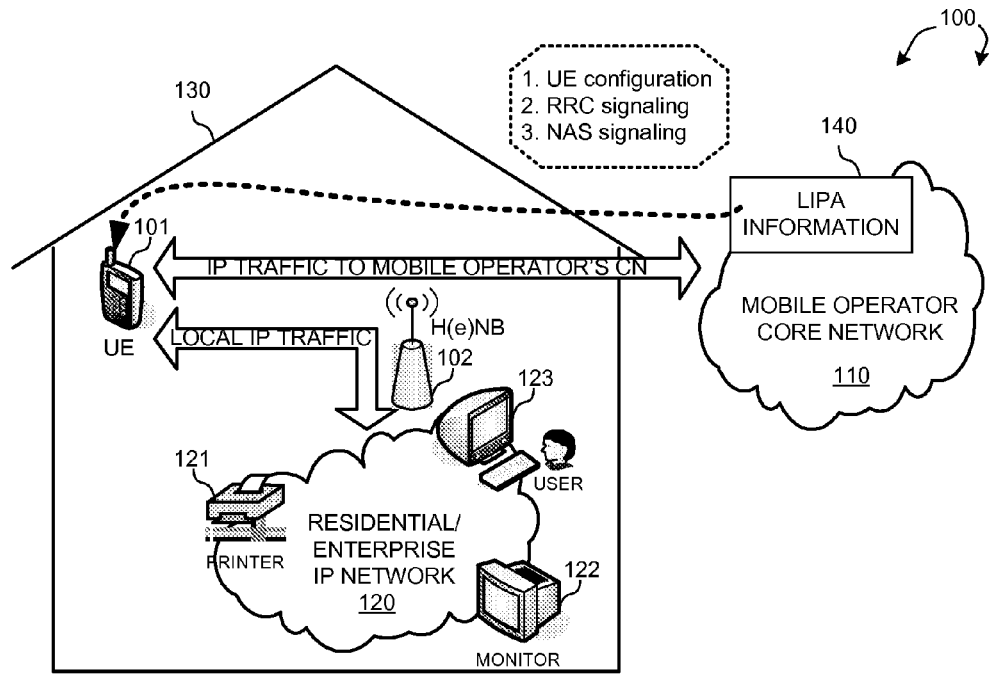
FIG. 1 illustrates a mobile wireless communication network that supports local IP access in accordance with one novel aspect.

FIG. 1 illustrates a mobile communication network 100 that supports local IP access (LIPA) in accordance with one novel aspect. Mobile communication network 100 comprises a user equipment (UE) 101 and a home eNodeB (H(e)NB or HeNB) 102 that provides radio access to a mobile operator core network (CN) 110. H(e)NB 102 is also part of a local residential or enterprise IP network 120, which includes a local printer 121, a local monitor 122, and a local computer server 123. In the example of FIG. 1, UE 101 is an IP capable UE, and H(e)NB 102 provides LIPA for UE 101 to connect to other IP entities (e.g., printer 121) in the same local IP network 120, which are all located inside home 130.

In general, LIPA provide access for IP capable UEs connected via H(e)NB (i.e., using H(e)NB radio access) to other IP capable entities in the same residential or enterprise IP network. This kind of behavior is called local IP breakout, where the IP packet is redirected via local IP server. LIPA is one of the protocols to implement local IP breakout. 3GPP has defined certain requirements for LIPA. First, a user may be notified when a home base station provides access to a residential or enterprise IP network. Second, the mobile operator shall be able to configure the home base station to enable or disable local IP access. Third, the mobile operator shall be able to enable or disable local IP access per user subscription per Closed Subscriber Group (CSG). Each home station is associated with a CSG cell having a CSG identifier (CSG ID). Whether or not a user is permitted to access a CSG cell is determined based on the user's subscription information.

In one novel aspect, an enhanced cell selection method is proposed using LIPA capability information. Based on LIPA capability related information, a UE is able to prioritize LIPA-capable cells and establish a corresponding packet data network (PDN) connection accordingly. FIG. 1 illustrates three different embodiments of providing LIPA information 140 to UE 101 for enhanced cell selection. In a first embodiment, LIPA information is statically configured in the UE based on provisioning. In a second embodiment, LIPA information is informed to the UE via broadcasting or unicasting Radio Resource Control (RRC) signaling. In a third embodiment, LIPA information is informed to the UE via Non Access Stratum (NAS) signaling.

Figure 2:
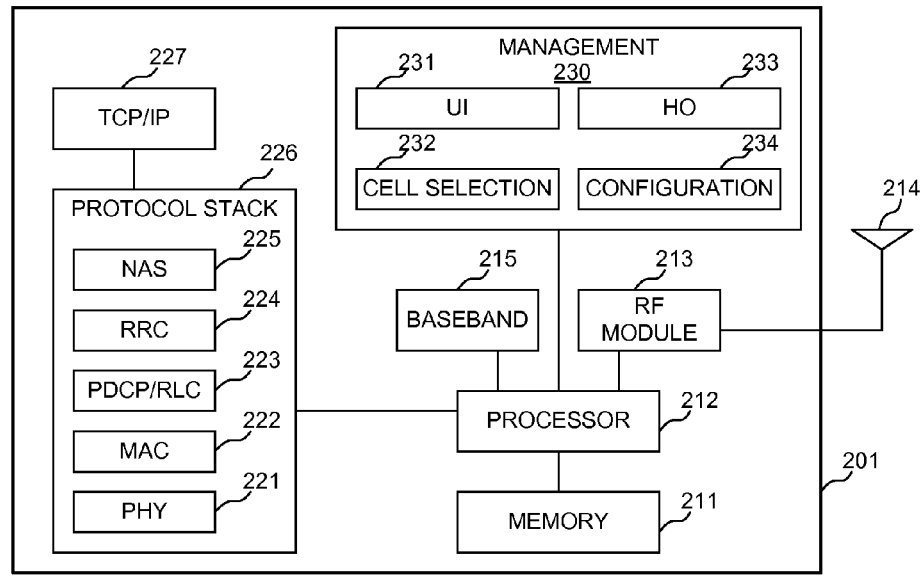
FIG. 2 illustrates a simplified block diagram of a user equipment in accordance with one novel aspect.

FIG. 2 illustrates a simplified block diagram of a user equipment UE 201 in accordance with one novel aspect. UE 201 comprises memory 211, a processor 212, a radio frequency (RF) module 213 coupled to antenna 214, a baseband module 215, a 3GPP protocol stack module 226 supporting various protocol layers including NAS 225, RRC 224, PDCP/RLC 223, MAC 222 and PHY 221, a TCP/IP protocol stack module 227, and a management module 230 including a user interface (UI) module 231, a cell (re)selection module 232, a handover (HO) module 233, and a configuration module 234. The various modules are function modules and may be implemented by software, firmware, hardware, or any combination thereof. The function modules, when executed by processor 212 (via program instructions contained in memory 211), interwork with each other to allow UE 201 to perform cell (re)selection and establish PDN connection based on LIPA information. For example, NAS 225 processes received NAS signaling such that the UE can store LIPA information contained in the NAS message. Cell selection module 232 then uses the stored LIPA information to prioritize LIPA-capable cells.

Figure 3:
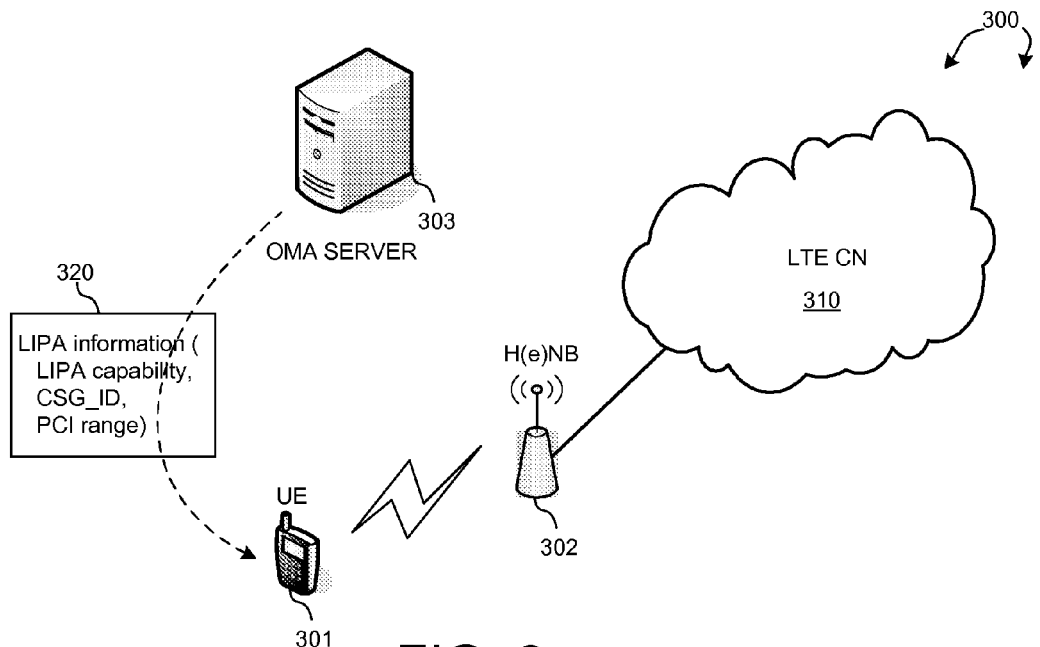
FIG. 3 illustrates a first method of providing LIPA indication via UE configuration.

FIG. 3 illustrates a first method of providing LIPA indication via UE configuration in a mobile communication network. Mobile communication network 300 comprises a UE 301, an H(e)NB 302, an Open Mobile Alliance (OMA) Device Management (DM) server 303, and a mobile operator's core network CN 310. Under the UE configuration method, the LIPA information is delivered by an Over the Air (OTA) protocol to UE 301. In the example of FIG. 3, OMA DM server 303 is used to deliver the LIPA information to UE 301. LIPA information typically includes LIPA capability of a HeNB, i.e., whether LIPA is supported by the HeNB.

An important aspect of H(e)NB functionality is the ability to restrict access to particular users. For example, access is limited to employees of a company on whose site the HeNB is deployed, to customers of a particular coffee shop chain, or (in the case of HeNBs deployed in private homes) to individuals. To achieve this functionality, 3GPP has defined the concept of CSG. When a cell is configured in CSG mode, only those users included in the cell's access control list are allowed to access the cell. When a UE subscribes to a CSG cell, the UE is then included in the CGS cell's access control list. A subscription may be temporary in nature (e.g. a coffee shop allows a customer one hour's access to its CSG cell). The CSG cell indicates that the HeNB is a CSG cell via system information broadcasting. The CSG cell also broadcasts a CSG ID via system information.

Under the UE configuration method, LIPA capability information may be statically configured in UE and stored in UE's Subscriber Identity Module or Universal Subscriber Identity Module (SIM/USIM). For example, a list of CSG IDs having LIPA support is statically configured in the UE based on provisioning. This method best suits the case for residential LIPA support. For enterprise deployment, it also makes sense that the support of LIPA of HeNB is statically configured. Therefore, the LIPA capability of HeNBs can be known in advance under this method. Furthermore, the configured information can be encrypted and protected.

This UE configuration method, however, cannot be applied to a scenario that not all HeNBs in an enterprise network support LIPA. In a corporate network, for example, it is possible that some of the HeNBs support LIPA while others do not. If the UE configuration is defined per CSG ID and not per HeNB, then the UE cannot identify whether a specific HeNB supports LIPA. To solve the UE configuration problem, it is proposed that LIPA capability of a specific HeNB is added as additional information attached to the list of CSG IDs. For example, Physical Cell ID (PCI) range information is provided per CSG ID to indicate the support of LIPA. Currently, a set of PCI ranging is already reserved for CSG-only cells and the PCI of each CSG cell can be configured by OAM. As illustrated in FIG. 3, LIPA information 320 delivered from OMA DM server 303 to UE 301 contains LIPA capability, a list of CSG IDs, and PCI range information for each CSG ID.

Figure 4:
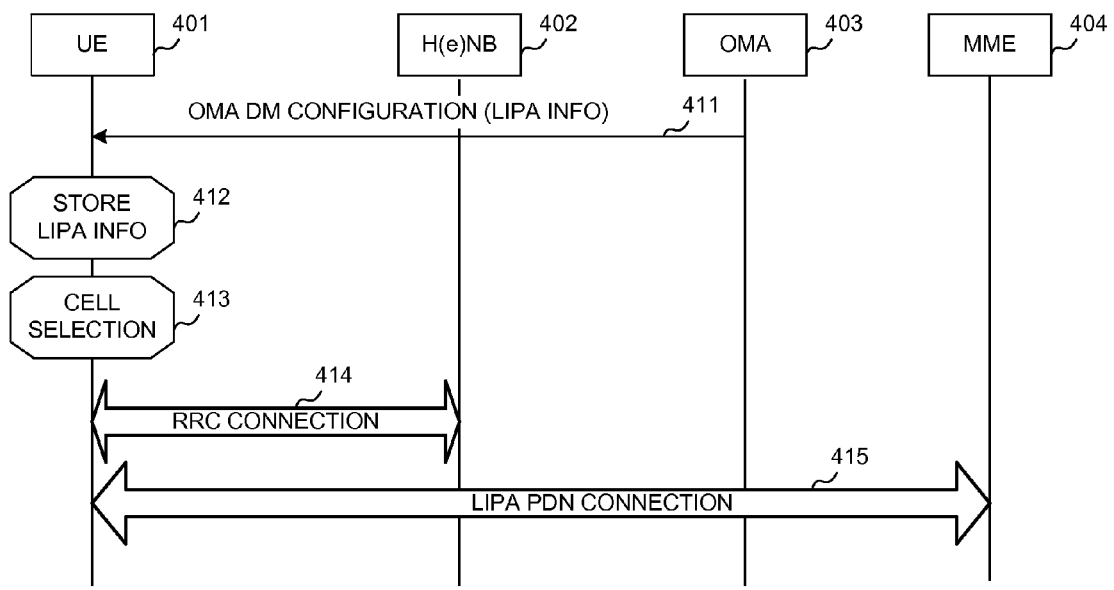
FIG. 4 illustrates one embodiment of providing LIPA indication according to the first method of UE configuration in a mobile communication network.

FIG. 4 illustrates one embodiment of providing LIPA indication according to the first method of UE configuration in a mobile communication network. In step 411, UE 401 receives an OMA DM configuration from OMA DM server 403. The OMA DM configuration may occur at any time, i.e., when UE 401 is in RRC_IDLE or RRC_Connected mode. The OMA DM configuration contains LIPA information, which includes LIPA capability, a list of CSG IDs, and a set of PCI ranging for each CSG. In step 412, UE 401 stores the LIPA information in SIM/USIM. In step 413, UE performs cell selection in idle mode. The stored LIPA information may be used to prioritize LIPA-capable cells. For example, HeNB 402 serves a LIPA-capable cell, which is selected by UE 401. In step 414, UE 401 establishes a RRC connection with HeNB 402. In step 415, UE 401 establishes a LIPA PDN connection with MME 404 as part of a Non Access Stratum (NAS) connection to set up a connection bearer with a mobility management entity (MME).

The first method of providing LIPA indication via UE configuration support both cell selection and cell reselection based on LIPA capability information. The method has no RAN impacts. However, the current Allowed CSG list MO defined in TS24.285 does not allow indication per H(e)NB. Therefore, this method has OAM impacts. New leaf needs to be defined in the Allowed CSG list and Operator CSG list for each CSG entry.

A second method of providing LIPA indication is via RRC signaling. The support of LIPA capability can be carried in broadcasting or unicasting fashion. For broadcasting method, the support of LIPA capability is broadcasted via System Information Block (e.g., SIB1). For unicasting method, the support of LIPA capability is indicated via dedicated RRC signaling.

Figure 5:
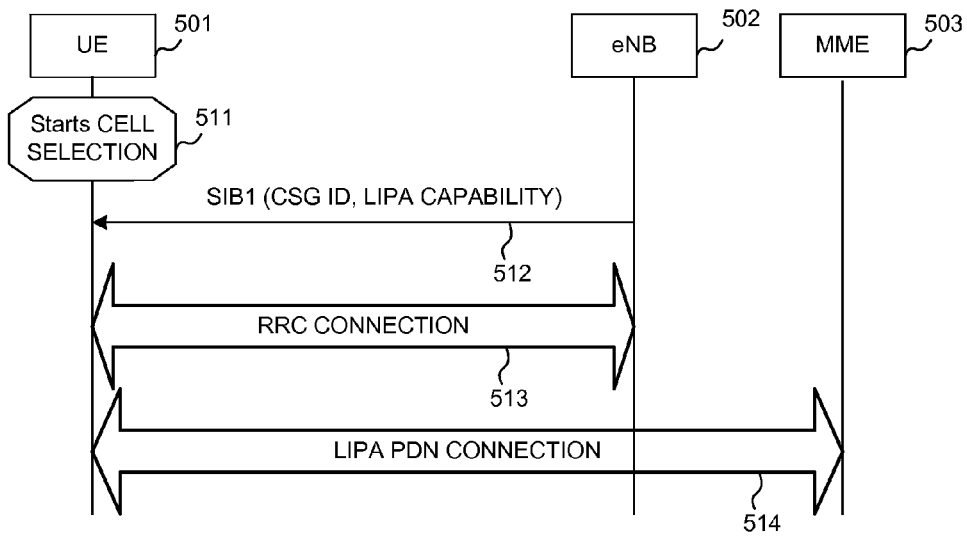
FIG. 5 illustrates one embodiment of providing LIPA indication via a second method of RRC signaling in a mobile communication network.

FIG. 5 illustrates one embodiment of providing LIPA indication via RRC broadcasting in a mobile communication network. In step 511, UE 501 starts to perform cell selection and tries to select a cell with the best link quality and/or other preferences (e.g., LIPA capability). In step 512, UE 501 reads SIB1 that is broadcasted from base station eNB 502. SIB1 contains CSG ID and LIPA capability information of a cell served by eNB 502, which helps UE 501 to make a preferred choice during the cell selection process. For example, UE 501 checks the contents of SIB1. If UE 501 belongs to the CSG (e.g., based on the CSG ID) and the cell indicates the support of LIPA, then this candidate cell is selected with higher priority. In step 513, UE 501 established an RRC connection with a selected LIPA-capable cell served by eNB 502. Finally, in step 514, UE 501 establishes a LIPA PDN connection with MME 503.

Figure 6:
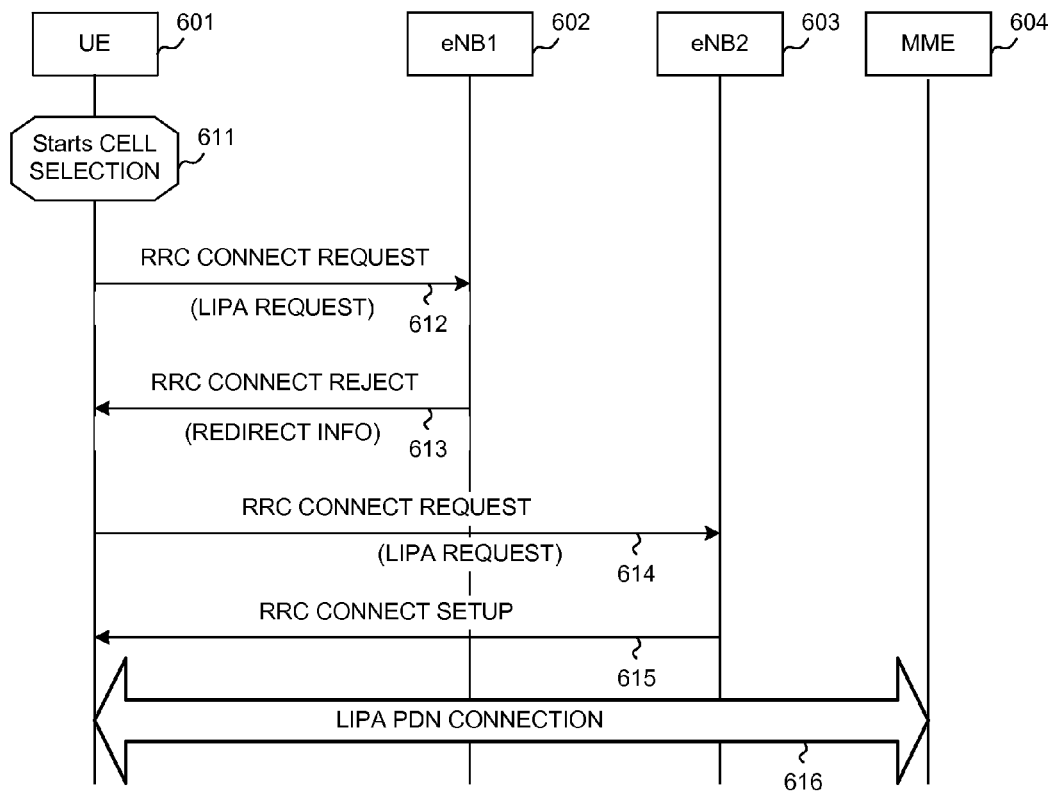
FIG. 6 illustrates another embodiment of providing LIPA indication via a second method of RRC signaling in a mobile communication network.

FIG. 6 illustrates one embodiment of providing LIPA indication via dedicated RRC signaling in a mobile communication network. In step 611, UE 601 starts to perform cell selection and tries to select a cell with the best link quality and/or other preferences (e.g., LIPA capability). UE 601, however, may not have any LIPA capability information at this point. In step 612, UE 601 selects a cell served by eNB1 602 and transmits a RRC connect request to eNB1 602. The RRC connect request indicates the preference for LIPA support. Upon receiving the RRC connect request, if eNB1 602 supports LIPA, then it may reply with a RRC connect setup back to UE 601 to establish a RRC connection. In the example of FIG. 6, however, eNB1 602 does not support LIPA. As a result, eNB1 602 redirects UE 601 to another LIPA-capable cell by handover procedure or connection release/reject with LIPA redirection information. For example, in step 613, eNB1 602 transmits a RRC connect reject message to UE 601. The RRC connect reject message contains LIPA redirection information, such as the physical cell ID of a LIPA-capable cell served by eNB2 603. In step 614, UE 601 transmits another RRC connect request to eNB2 603. The RRC connect request again indicates the preference for LIPA support. In step 615, eNB2 603 replies with a RRC connect setup back to UE 601. The RRC connect setup message indicates the support of LIPA. Finally, in step 616, UE 601 and MME 604 establish a LIPA PDN connection.

The second method of providing LIPA indication via RRC signaling has RAN impact. For broadcasting method, it supports both cell selection and cell reselection based on LIPA capability if the LIPA capability information is indicated by SIB1. For unicasting method, the eNB can indicate the support of LIPA, or the UE can indicate the preference of LIPA. However, RRC message (both broadcasting and unicasting) needs modification to convey the LIPA indication.

Figure 7:
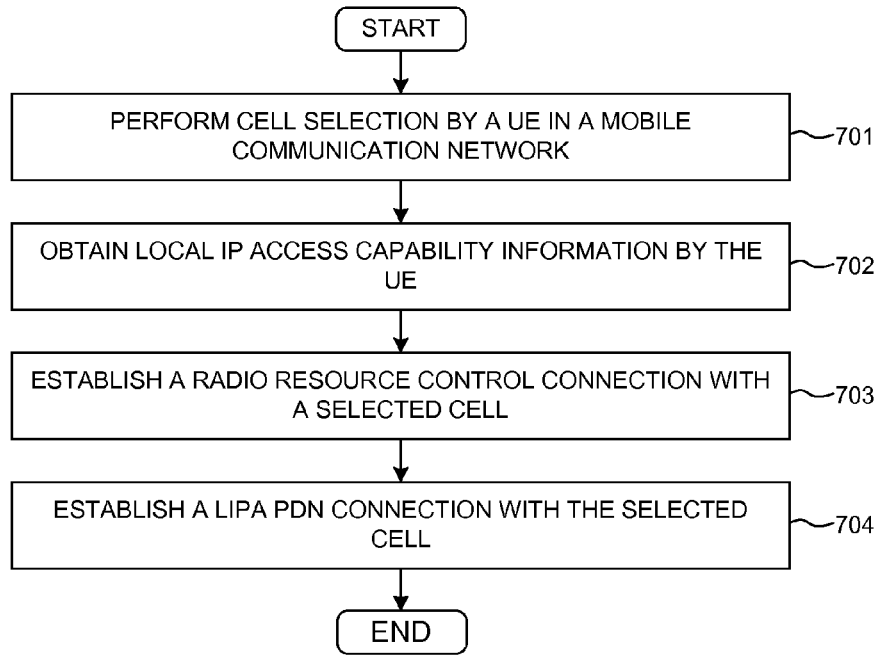
FIG. 7 is a flow chart of a method of providing LIPA indication from user equipment aspect in accordance with one novel aspect.

FIG. 7 is a flow chart of a method of providing LIPA indication from user equipment aspect in accordance with one novel aspect. In step 701, a UE performs cell selection in a mobile communication network. The UE performs various measurements over different cells so that the UE can select a cell with the best link quality. In step 702, the UE obtains LIPA information of one or multiple cells including LIPA capability and associated CSG IDs. Note that step 702 may be performed before step 701. In one example, the UE receives LIPA information from an OTA protocol (e.g., from an OMA DM server) and then stores the information in SIM/USIM before the cell selection. In another example, the UE reads LIPA information broadcasted via SIB1. The UE is then able to prioritize LIPA-capable cells during the cell selection. In step 703, the UE establishes a RRC connection in a selected LIPA-capable cell with a HeNB. In step 704, the UE established a LIPA PDN connection in the selected LIPA-capable cell with an MME.

Figure 8:
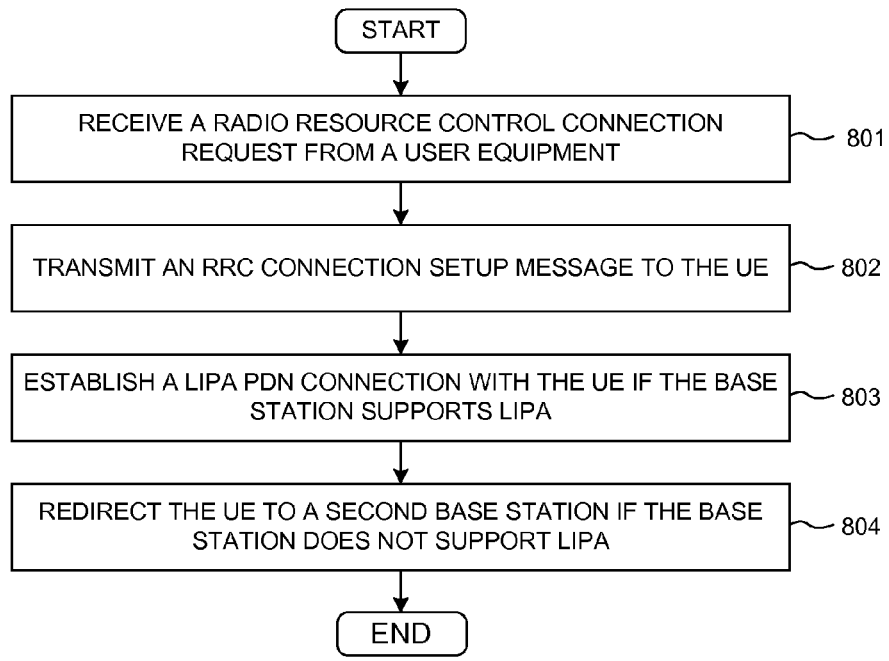
FIG. 8 is a flow char of a method of providing LIPA indication from base station aspect in accordance with one novel aspect.

FIG. 8 is a flow chart of a method of providing LIPA indication from base station aspect in accordance with one novel aspect. In step 801, a home base station HeNB receives a RRC connect request message from a UE in a mobile communication network. The RRCConnectionRequest message indicates the preference of LIPA support. In step 802, the HeNB transmits a RRC connection setup message to the UE. The RRCConnectionSetup message indicates whether LIPA is supported. In step 803, the HeNB establishes a LIPA PDN connection with the UE if the HeNB supports LIPA. Alternatively, in step 804, if the HeNB does not support LIPA, then the HeNB redirects the UE to another cell by handover or by connection release/reject with LIPA redirect information.

Figure 9:
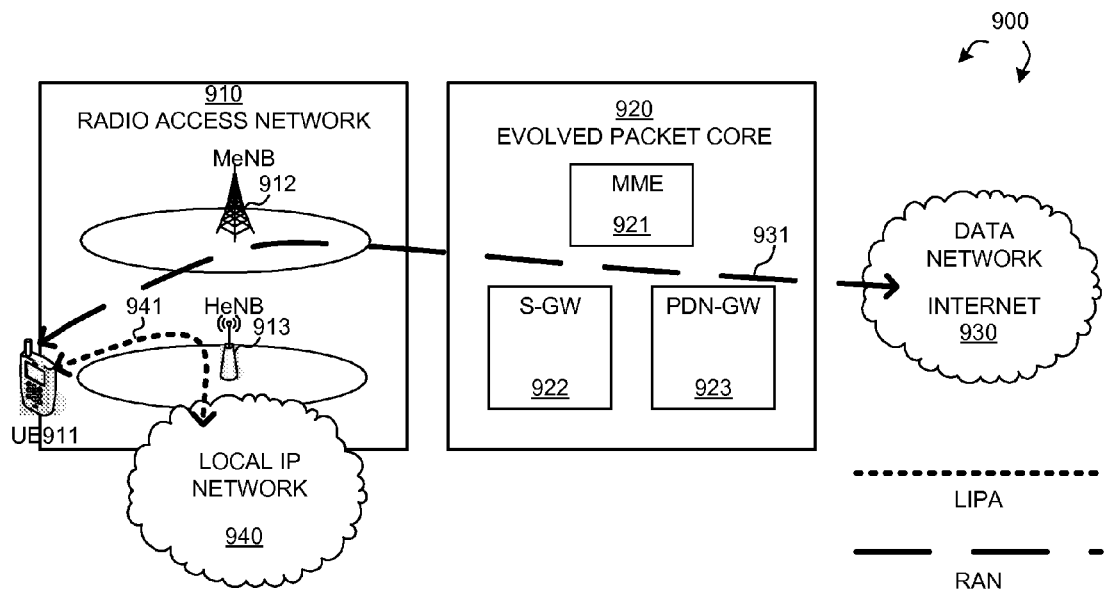
FIG. 9 illustrates a third method of providing LIPA indication via NAS signaling.

FIG. 9 illustrates a third method of providing LIPA indication via NAS signaling in a mobile communication network 900. Mobile communication network 900 comprises a radio access network (RAN) 910, an evolved packet core (EPC) 920, and a mobile operator's data network or the Internet 930. The radio access network 910 comprises a user equipment UE 911, a macro base station MeNB 912, and a home base station HeNB 913. Evolved packet core 920 comprises a mobility management entity MME 921, a serving gateway (S-GW) 922, and a packet data network gateway (PDN-GW) 923. In mobile communication network 900, the radio access network 910 provides cellular access for UE 911 to access mobile operator's data network and/or the Internet 930 via the evolved packet core 920 (e.g., as depicted by a long-dashed line 931).

The home base station HeNB 913, however, is also part of a local IP network 940. Therefore, if the HeNB has LIPA capability, then HeNB 913 can provide LIPA for UE 911 to directly communicate with other IP devices in the local IP network 940 (e.g., as depicted by a short-dashed line 941). Once a LIPA PDN connection is established for UE 911 through HeNB 913, the data traffic does not traverse through the evolved packet core network 920, while the signaling traffic continue to traverse through the evolved packet core network 920.

In general, the NAS layer can provide information to instruct cell selection performed in the AS layer. The NAS layer controls cell selection, for example, by indicating the preference of RAT(s)/cells associated with the selected PLMN to be used initially in the search of a cell. NAS also maintains lists of forbidden registration areas and a list of CSG IDs and their associated PLMN ID on which the UE is allowed (CSG white list) and provide these lists to AS layer. On the other hand, the UE AS layer searches for a suitable cell and perform measurements needed to support cell selection.

Therefore, the general idea of the NAS-based signaling method for LIPA indication is that "the support of LIPA" information is provided to UE 911 by MME 921 via a NAS message after an RRC connection is established for UE 911. The problem of such method is that a UE may only be aware of LIPA support after it establishes an RRC connection and receives a NAS message. Because the LIPA capability is static information for HeNB, it is thus proposed that UE 911 stores the LIPA information when receiving the NAS message from MME 921. Later on, when UE 911 performs cell selection in idle mode, UE 911 can use the stored LIPA capability information to prioritize the LIPA-capable cells. One advantage of the NAS signaling method is that it is up to the UE implementation to store and utilized the LIPA capability information, as long as such information is known by the MME/SGSN and provided to the UE via a NAS message.

Figure 10:
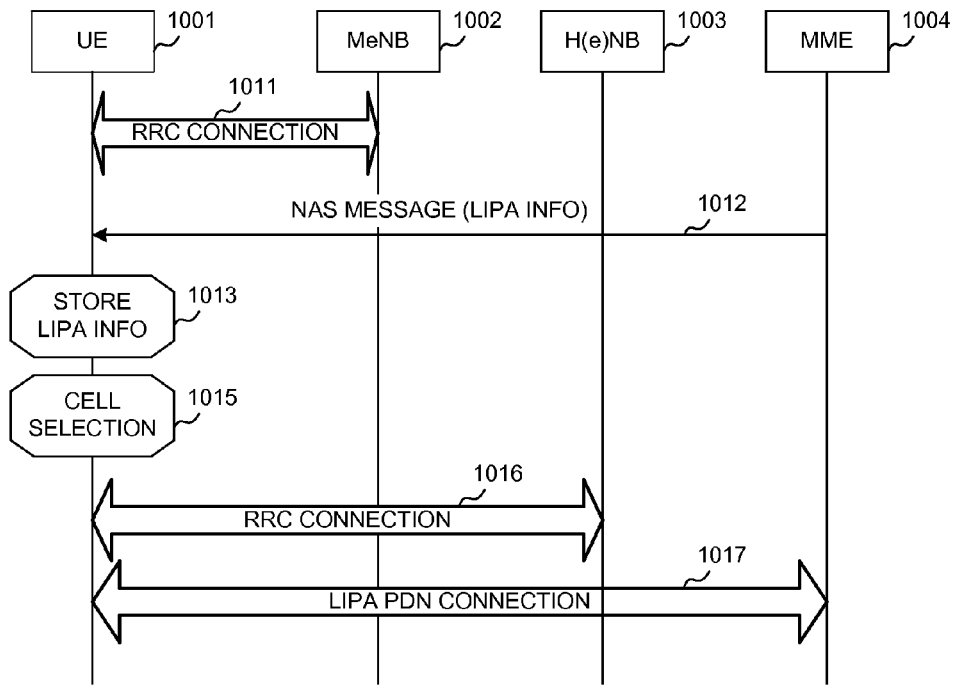
FIG. 10 illustrates one embodiment of providing LIPA indication according to the third method of NAS signaling in a mobile communication network.

FIG. 10 illustrates one embodiment of providing LIPA indication according to the third method of NAS signaling in a mobile communication network. In step 1011, UE 1001 first establishes an RRC connection with a macro base station MeNB 1002. Afterwards, UE 601 receives a NAS message from MME 1004 (step 1012). The NAS message specifies a list of LIPA-capable cells with the same CSG ID. Note that, CSG ID is an identification of a group of cells sharing the same access control list. In step 1013, UE 1001 stores the received LIPA information. Later on, UE 1001 goes back to idle mode. In step 1015, UE 1001 performs cell selection in idle mode. The stored LIPA information may be used to prioritize LIPA-capable cells. For example, HeNB 1003 serves a LIPA-capable cell having the same CSG ID, which is then selected by UE 1001. In step 1016, UE 601 establishes a RRC connection with HeNB 1003. In step 1017, UE 1001 establishes a LIPA PDN connection with MME 1004 as part of a NAS connection to set up a connection bearer.

Figure 11:
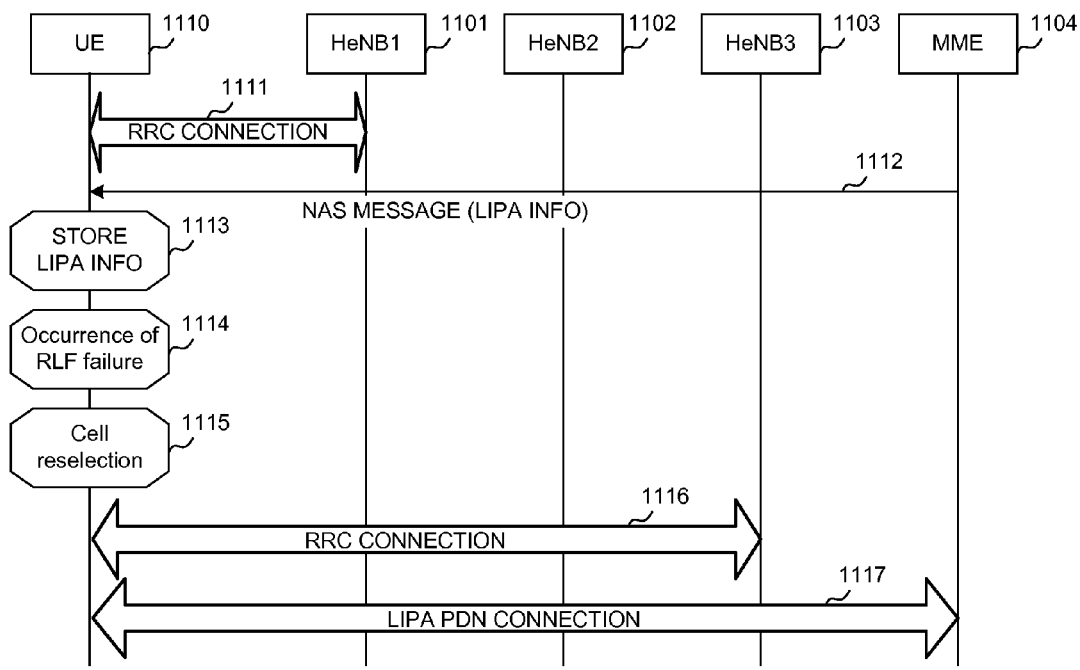
FIG. 11 illustrates another embodiment of providing LIPA indication according to the third method of NAS signaling in a mobile communication network.

FIG. 11 illustrates another embodiment of providing LIPA indication according to the third method of NAS signaling in a mobile communication network. In step 1111, UE 1110 first establishes an RRC connection with a first home base station HeNB1 1101. Afterwards, UE 1110 receives a NAS message from MME 1104 (step 1112). The NAS message specifies LIPA capability of the cell. In one embodiment, NAS message specifies a list of LIPA-capable cells with the same CSG ID. Note that, CSG ID is an identification of a group of cells sharing the same access control list. In step 1113, UE 1110 stores the received LIPA information as historical data. NAS layer only indicates the LIPA capability of the current cell. However, UE can collect the LIPA information for all the cells that it camped before. Later on, a radio link failure (RLF) event occurred (step 1114). In step 1115, UE 1110 performs cell reselection in idle mode. The stored LIPA information may be used to prioritize LIPA-capable cells. For example, a second home base station HeNB2 1102 does not support LIPA; while a third home base station HeNB3 1103 does support LIPA. For example, HeNB3 1103 serves a LIPA-capable cell having the same CSG ID, which is then selected by UE 1001. In step 1116, UE 1110 establishes a RRC connection with HeNB3 1103. In step 1117, UE 1110 establishes a LIPA PDN connection with MME 1104 as part of a NAS connection to set up a connection bearer. Note that, the RLF-triggered is one of the examples of cell reselection. In one embodiment, cell reselection is triggered by connection release (or reject) with cell redirection information. UE can perform cell reselection by considering the redirection information and the stored LIPA-capable cell information.

Figure 12:
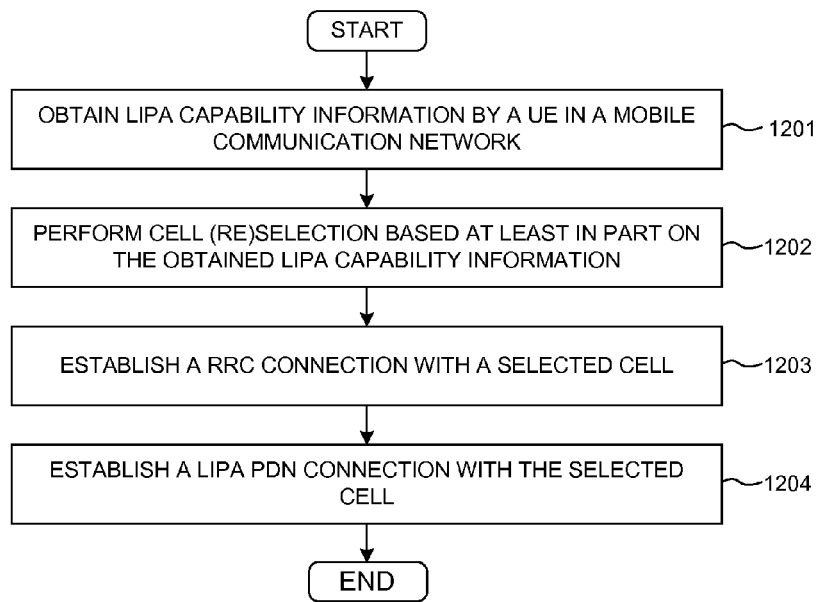
FIG. 12 is a flow chart of a method of providing LIAP indication via NAS signaling.

FIG. 12 is a flow chart of a method of providing LIAP indication via NAS signaling in accordance with one novel aspect. In step 1201, a UE obtains LIPA information in a mobile communication network. In one example, the LIPA information is contained in a NAS message from an MME in the mobile communication network. The UE stores the LIPA information such that it is then able to prioritize LIPA-capable cells during cell (re)selection. In step 1202, the UE performs cell selection or cell reselection. The UE performs various measurements over different cells so that the UE can select a cell with the best link quality. The UE also take into account which cell is LIPA-capable. In step 1203, the UE establishes a RRC connection in a selected LIPA-capable cell with a HeNB. In step 1204, the UE established a LIPA PDN connection in the selected LIPA-capable cell with an MME.

In general, if less RAN impact is the design goal, then the method of UE configuration or NAS signaling can be applied. UE can get some preferences (e.g., LIPA-capable cells) from higher layer before performing cell selection or cell reselection. Thus, the proposed methods can be viewed as a cell (re)selection enhancement. The NAS and RRC LIPA indication can be independent (e.g., co-exist). The RRC signaling can be used to reveal LIPA support in AS level, while the NAS signaling can be used to transmit a list of LIPA supported HeNBs or CSGs.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   obtaining Local IP Access (LIPA) capability information by a user equipment (UE) in a mobile communication network, wherein the LIPA capability information is obtained via a Non Access Stratum (NAS) message from a Mobility Management Entity (MME), and wherein the NAS message is received after establishing a first radio resource control (RRC) connection;
   detecting a cell selection or cell reselection trigger event and entering an idle mode;
   performing cell selection or cell reselection by the UE based at least in part on the obtained LIPA capability information;

establishing a second radio resource control (RRC) connection with a selected cell; and establishing a LIPA packet data network (PDN) connection with the selected cell.

2. The method of claim 1, wherein the cell (re) selection is selectively determined by the obtained LIPA capability information.

3. The method of claim 1, wherein a LIPA-capable cell is prioritized over a non-LIPA-capable cell during the cell (re) selection.

4. The method of claim 1, wherein the LIPA capability information comprises a Closed Subscriber Group (CSG) ID and a list of LIPA-supported Home-eNodeB (HeNB) cell IDs belonging to the same CSG ID.

5. The method of claim 1, wherein the trigger event is a radio link failure (RLF) event.

6. The method of claim 1, wherein the trigger event is receiving a connection release message with redirection information by the UE.

7. A user equipment (UE), comprising:
memory that contains a set of program instructions; and
a processor that executes the set of program instructions and thereby manipulates the UE to perform the steps of:
obtaining Local IP Access (LIPA) capability information by in a mobile communication network, wherein the LIPA capability information is obtained via a Non Access Stratum (NAS) message from a Mobility Management Entity (MME), and wherein the NAS message is received after establishing a first radio resource control (RRC) connection;

detecting a cell selection or cell reselection trigger event and entering an idle mode;

performing cell selection or cell reselection by the UE based at least in part on the obtained LIPA capability information, establishing a second radio resource control (RRC) connection with a selected cell; and establishing a LIPA packet data network (PDN) connection with the selected cell.

8. The UE of claim 7, wherein the LIPA capability information comprises a Closed Subscriber Group (CSG) ID and a list of LIPA-supported Home-eNodeB (HeNB) cell IDs belonging to the same CSG ID.

9. The UE of claim 7, wherein the cell (re) selection is selectively determined by the obtained LIPA capability information.

10. The UE of claim 7, wherein a LIPA-capable cell is prioritized over a non-LIPA-capable cell during the cell (re) selection.

11. The UE of claim 7, wherein the trigger event is a radio link failure (RLF) event.

12. The UE of claim 7, wherein the trigger event is receiving a connection release message with redirection information by the UE.

* * * * *